UNITED STATES PATENT OFFICE.

WALTER A. PATRICK, OF BALTIMORE, MARYLAND

SILICA GEL AND PROCESS OF MAKING SAME.

1,297,724.  Specification of Letters Patent.  Patented Mar. 18, 1919.

No Drawing.  Application filed December 7, 1918.  Serial No. 265,761.

*To all whom it may concern:*

Be it known that I, WALTER A. PATRICK, a citizen of the United States, residing in Baltimore, Maryland, have invented certain new and useful Improvements in Silica Gels and Processes of Making Same, of which the following is a specification.

This invention has reference to novel adsorbent materials and to novel methods of producing these adsorbents.

It is a special object of my invention to produce highly porous gels of silica possessing great adsorbing powers. A further object of my invention is to eliminate the objections and uncertainties in the present methods of preparing silica gels and to carry out the process in a simple and efficient manner which yields a uniform product.

Another object of my invention is to produce a highly porous, hard silica gel and which when the water content is greatly reduced will be transparent and have a glassy appearance.

A still further object of my invention is to improve the method of drying the precipitated silica gel so as to produce a gel which shall be stable at high temperatures.

Silica gel has been prepared by mixing solutions of sodium silicate or water-glass with acid solutions. A large excess of acid was used in order to prevent the mixture from setting in the process of mixing, because gel formed by rapid setting when acid is added to water-glass has been found worthless as an adsorbent. In order to get the mixture to set it was then found necessary to remove the excess acid and the salt formed in the reaction. This is invariably done by dialysis, a process which is very slow and furthermore wasteful of silicic acid, because the colloidal silicic acid passes through the dialyzing membrane at the beginning of the dialysis. In my improved process, I produce cilica gel of excellent quality by avoiding the impractical and cumbersome step of dialysis.

I carefully determine the concentrations of acid and water-glass solution that when mixed in equal volumes will set to a clear gel within 4 or 5 hours after mixing. Great care must be exercised in bringing the acid and water-glass together, because, owing to the instability of the mixture a rapid coagulation will take place. I prevent this coagulation by efficiently stirring the solutions at the moment of mixing. When HCl is used as the acid a 10% solution (by weight) is employed with a sodium silicate solution having a specific gravity of about 1.185. I obtain good results with water-glass having specific gravities of 1.15 to 1.22. Fairly good results may be obtained with the specific gravity of the water-glass ranging from 1.1 to 1.3. I find that the temperature of the solutions at the time of mixing is an important factor in the time required for the setting of the gel. At a temperature of about 50° C. the mixture sets to a gel in thirty minutes to one hour and the product is just as good as the gel formed by mixing the solutions at a lower temperature but requiring a considerably longer time to set. The preferable temperatures for the solutions at the time of mixing are from 45° to 55° C. but satisfactory results may be obtained at temperatures from 35° to 80° C. On mixing the acid and soluble silicate solution a colloidal solution of silicic acid is first formed. It is from this solution that the silicious compound sets to a gel.

The gel which is formed by allowing the mixture to set is then broken into small pieces and washed free from acid and salt; if the wash water is heated, the washing of the gel is facilitated. The washed gel must now be carefully dried before it can be used. It is essential that the water be removed slowly in the drying operation. I, therefore, first dry the gel in a stream of air at 75° to 120° C. The gel still contains a small quantity of water and is then dried by increasing the temperature slowly up to 300° to 400° C. This produces a most stable substance which can be safely heated to 700° C. without fear of injury.

The method of drying may be modified by taking the material after the first heating at 75° to 120° C., as above described, and subjecting same to a vacuum to remove some more water, the temperature during the vacuum treatment being from 75° to 120° C. The product obtained by this method is just as stable as if the water had been removed by further heating up to 300°–400° C. This gel which is dried in a vacuum is also stable up to 700° C.

The final product is a hard, transparent substance resembling glass very closely in appearance. When prepared in the above manner, it is very porous, the pores being ultra-microscopic. It is due to this fine porous structure that the gel owes its property of adsorption. Hardness is a desirable property for the gel to possess in order that it may retain its shape and structure and not crumble or pack when placed in a vessel for the adsorption of gas. The danger of getting a compact mass which would offer resistance to the passage of the substance to be adsorbed is thereby eliminated.

Transparency is a function of the size of the pores and water content of the silica gel. When the pores of the gel are filled up with water the pores are large and the gel is transparent. As the water content of the gel is decreased the pores become smaller and the gel loses its transparency up to a certain point. On further reduction of the water content beyond this point the pores continue decreasing in size and the gel begins to recover its transparency; when the water is nearly all eliminated the gel is practically transparent and the pores ultra-microscopic.

In the foregoing example, I described the use of HCl, but any other acid, or mixture of acids, may be used instead. All that is necessary is to regulate the concentration and temperature so that the proper stability of the mixture is attained. Also, other soluble silicates, such as potassium silicate, or mixtures of soluble silicates may be substituted for sodium silicate. The present invention is not limited to the specific details set forth in the foregoing example which should be construed as illustrative and not by way of limitation, and in view of the numerous modifications which may be effected therein without departing from the spirit and scope of my invention, I desire, that only such limitations be imposed as indicated in the appended claims.

In the following claims the word stable in defining the gel is used to mean the property of the gel to retain its characteristics of adsorbing gases and vapors and not undergo chemical change in the presence of air or lose its hardness and transparency.

I claim as my invention:

1. A porous gel stable at temperatures up to 700° C. and having high adsorptive powers.

2. A hard, porous gel, stable at temperatures up to 700° C. and having high adsorptive properties.

3. A hard, porous, transparent gel, stable at temperatures up to 700° C. and having high adsorptive powers, the pores being ultra-microscopic.

4. A porous, glassy silica gel, the pores being ultra-microscopic.

5. A silica gel having ultra-microscopic pores and stable in the presence of air up to 700° C.

6. A hard, transparent silica gel having a cellular structure, glassy appearance, high adsorptive powers and stable at temperatures up to 700° C.

7. A silica gel having a glassy appearance and perforated with exceedingly minute pores, such gel being stable at temperatures up to 700° C. and possessing high adsorptive properties.

8. A process of preparing silica gel, consisting in adding an acid to a soluble silicate solution and thoroughly stirring the substances at the moment of mixing.

9. A process of preparing silica gel comprising adding HCl to a soluble silicate solution in proportion sufficient to set free all of the silicic acid of the silicate and thoroughly stirring the substances at the moment of mixing.

10. A process of preparing silica gel consisting in adding equal volumes of a 10% HCl solution and sodium silicate solution having a specific gravity between 1.15 and 1.22 to each other and thoroughly stirring the same at the moment of mixing.

11. A process of making silica gel comprising adding an acid to a soluble silicate solution, the temperatures of the acid and soluble silicate being between 45° and 55° C. thoroughly stirring the same at the moment of mixing, allowing the gel thus formed to set, washing and then slowly drying said gel.

12. A process of making silica gel comprising adding an acid to a soluble silicate solution, thoroughly stirring the same at the moment of mixing, allowing the gel thus formed to set, washing and then slowly drying said gel.

13. A process of making silica gel comprising adding a 10% HCl solution to an equal volume of sodium silicate solution having a specific gravity between 1.15 and 1.22, thoroughly stirring same at the moment of mixing, allowing the gel thus formed to set, washing and then slowly drying said gel.

14. A process of preparing silica gel comprising adding an acid to a soluble silicate in quantity not less than the equivalent amount of silicic acid to be liberated from the soluble silicate, thoroughly stirring the substances at the moment of mixing, allowing the gel thus formed to set, washing said gel to remove acid and salt, drying the gel in a current of air heated to 75°–120° C. and then slowly increasing the temperature to a point not exceeding 400° C.

15. A process of preparing silica gel comprising adding an acid to a soluble silicate in quantity not less than the equivalent amount of silicic acid to be liberated from the soluble silicate, thoroughly stirring the substances at the moment of mixing, allowing the gel thus formed to set, washing said gel to remove acid and salt, drying the gel in a current of air heated to 75°–120° C.

and then slowly increasing the temperature to 300°–400° C.

16. A process of making silica gel comprising adding a 10% solution of HCl to an equal volume of sodium silicate solution of 1.185 specific gravity, thoroughly stirring same at the moment of mixing, allowing the gel thus formed to set, washing said gel to remove acid and salt, drying the gel in a current of air heated to 75°–120° C. and then slowly increasing the temperature to a point not exceeding 400° C.

17. A process of making silica gel comprising adding a 10% solution of HCl to an equal volume of sodium silicate solution having a specific gravity between 1.1 to 1.3, the temperature of the acid and silicate being between 35° and 80° C., thoroughly stirring same at the moment of mixing, allowing the gel thus formed to set, washing said gel to remove acid and salt, drying the gel in a current of air heated to 75°–120° C. and then slowly increasing the temperature to 300°–400° C.

18. A process of making silica gel comprising adding a 10% solution of HCl to an equal volume of sodium silicate solution having a specific gravity between 1.15 and 1.22, the temperature of the acid and silicate being between 45° and 55° C., thoroughly stirring same at the moment of mixing, allowing the gel thus formed to set, washing said gel to remove acid and salt, drying the gel in a current of air heated to 75°–120° C., and then slowly increasing the temperature to 300°–400° C.

19. In a process of making silica gel allowing a colloidal silicious composition to set to a gel, drying the gel in a current of air heated to 75°–120° C., and then slowly increasing the temperature.

20. In a process of making silica gel allowing a colloidal silicious composition to set to a gel, drying the gel in a current of air heated to 75°–120° C., and then slowly increasing the temperature to 300°–400° C.

21. In a process of making silica gel allowing a colloidal silicic acid solution to set to a gel, drying the gel in a current of air heated to 75°–120° C., and then slowly increasing the temperature to a point not exceeding 400° C.

22. In a process of making silica gel allowing a colloidal silicious composition to set to a gel, drying the gel in a current of air heated to 75°–120° C., and then subjecting the gel to a vacuum.

23. In a process of making silica gel allowing a colloidal silicic acid solution to set to a gel, drying the gel in a current of air heated to 75°–120° C., and then subjecting the gel to a vacuum.

24. In a process of making silica gel, allowing a colloidal silicious composition to set to a gel, drying the gel in a current of air heated to 75°–120° C., and then subjecting the gel to a vacuum at a temperature between 75°–120° C.

25. In a process of making silica gel, allowing a colloidal silicious composition to set to a gel, drying the gel in a current of air heated to 75°–120° C., subjecting the gel to a vacuum and then further heating the gel.

26. In a process of making silica gel allowing a colloidal silicious composition to set to a gel, drying the gel in a current of air heated to 75°–120° C., subjecting the gel to a vacuum and then further heating the gel above 120° C.

27. A process of making silica gel comprising adding an acid to a soluble silicate solution, thoroughly stirring same at the moment of mixing, allowing the gel thus formed to set, washing said gel, drying same in a current of air at 75°–120° C., and then subjecting the gel to a vacuum.

28. A process of preparing a hard, transparent, porous silica gel having high adsorptive properties comprising adding a solution of HCl to a solution of sodium silicate in quantity sufficient to set free all of the $SiO_2$ of the silicate, thoroughly stirring the substances at the moment of mixing, allowing the gel thus formed to set, washing said gel to remove acid and salt, drying the gel in a current of air heated to 75°–120° C., and then subjecting the gel to a vacuum.

29. A process of making silica gel comprising adding a 10% solution of HCl to an equal volume of sodium silicate solution having a specific gravity between 1.15 and 1.22, the temperature of the acid and silicate being between 45° and 55° C., thoroughly stirring same at the moment of mixing, allowing the gel thus formed to set, washing said gel to remove acid and salt, drying the gel in a current of air heated to 75°–120° C., and then subjecting the gel to a vacuum.

30. A process of making silica gel comprising adding a 10% solution of HCl to an equal volume of sodium silicate solution of 1.185 specific gravity, the temperature of the acid and silicate being about 50° C., thoroughly stirring same at the moment of mixing, allowing the gel thus formed to set, washing said gel to remove acid and salt, drying the gel in a current of air heated to 75°–120° C., and then subjecting the gel to a vacuum.

WALTER A. PATRICK.

DISCLAIMER 1,297,724.—*Walter A. Patrick*, Baltimore, Md. SILICA GEL AND PROCESS OF MAKING SAME. Patent dated March 18, 1919. Disclaimer filed October 12, 1922, by the assignee, *The Silica Gel Corporation*.

Hereby enters its disclaimer of claims 1 to 7, inclusive, of said patent.

[*Official Gazette November 7, 1922.*]